April 2, 1957 J. KRUITHOF ET AL 2,787,668
ASSEMBLING ARRANGEMENT FOR COMMUTATING MECHANISMS
Filed Jan. 2, 1953
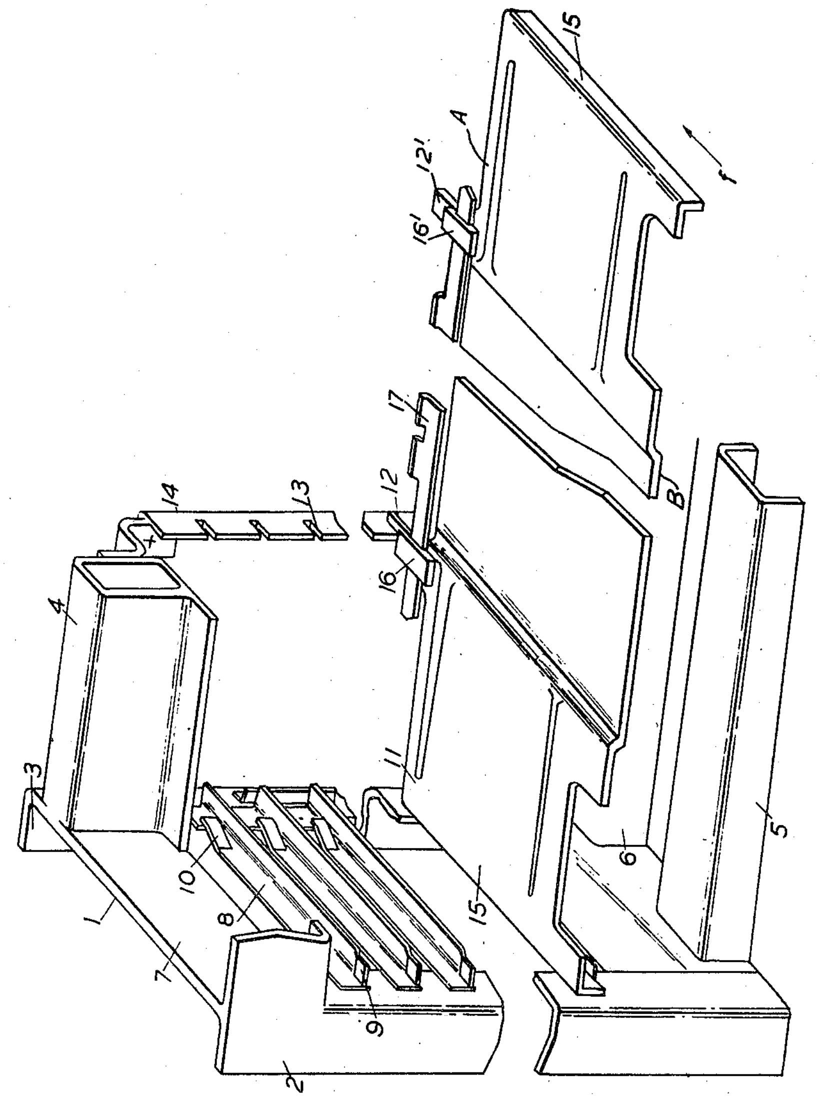
INVENTORS
J. KRUITHOF
L. J. G. NYS
J. L. J. DONCEEL
By Robert Harding Jr.
Attorney United States Patent Office 2,787,668

Patented Apr. 2, 1957

2,787,668

ASSEMBLING ARRANGEMENT FOR COMMUTATING MECHANISMS

Jakob Kruithof, Louis Jacques Ghislain Nys, and Jules Louis Joseph Donceel, Antwerp, Belgium, assignors to International Standard Electric Corporation, New York, N. Y., a corporation of Delaware Application January 2, 1953, Serial No. 329,424

Claims priority, application Netherlands January 12, 1952

2 Claims. (Cl. 179—27.54)

This invention relates to an arrangement for assembling commutating or switching mechanism such as contact banks used in switches of the crossbar type disclosed in our applications Serial No. 280,252, filed April 3, 1952, and Serial No. 280,253, filed April 3, 1952.

In such a multi-switch, it is desirable to be able to pile-up a plurality of commutating mechanisms, each mounted on a plate to be fastened to a framework. Commutating mechanisms mounted on a plate can have a very small height and it is therefore possible to superpose a large number of these. Hence, the framework should include guiding means for the plates and positioning means to ensure that the plates are in a well defined position with respect to the framework. This is an essential requirement, because these commutating mechanisms have to cooperate with common selecting and operating means which may be mounted on the main framework as well as outlet conductors.

An object of the invention is to provide means for stacking up a plurality of commutating mechanisms mounted on plates, by using a framework which is so arranged that each plate can be inserted at its corresponding level in drawerlike manner.

An appreciable number of commutating mechanisms are mounted on each plate since together they form an individual switch, e. g. a selector, which must have access to an appreciable number of outlets. For these selectors which together constitute a multi-switch such as disclosed in said application Serial No. 280,252, select bars are first of all used in order to determine a row of commutating mechanisms, one of which has to be operated. The displacement of a select bar therefore brings a series of commutating mechanisms in cooperation with other bars without the commutating mechanisms being actually displaced. These and other bars which are called actuating and hold bars are generally arranged perpendicularly to the select bars and the displacement of one of these actuating and hold bars will operate that commutating mechanism which has been brought into cooperation with the actutaing and hold bar due to the operation of the select bar.

Each actuating and hold bar has to cooperate with a whole row of commutating mechanisms and it would therefore be advantageous to mount said bar on the plate which supports a plurality of commutating mechanisms to ensure proper spacing between the latter and the common bar and thereby proper operation.

Another object of the invention is to provide for the mounting of an actuating and hold bar on the plate which supports the corresponding commutating mechanisms.

The plates on which the commutating mechanisms are mounted should, of course, be sufficiently rigid since otherwise, even a small amount of buckling would cause incorrect cooperation between the parts mounted on the plate and those mounted on the framework, i. e. the select bars. Also, as shown in our said application Serial No. 280,252, the multiple outlet conductors traverse the plates at right angles through suitable holes and buckling might prevent the insertion of said multiple conductors.

Furthermore, as these plates and the corresponding actuating and hold bars are rather long, a small amount of buckling might easily cause complete jamming of the bar preventing its displacement. One way to obtain a rigid plate is to make it of thick steel or the like, but this will greatly increase the overall weight of the plate and the commutating mechanisms mounted thereon, whereby the whole multi-switch assembly will be very heavy. It is accordingly preferable to be able to use a plate of lighter material such as aluminum but then small deflections are likely to occur due to the weight of the components mounted thereon.

In accordance with a feature of the invention the inside vertical surfaces of the framework are provided with a series of brackets so as to provide guiding means for sliding the plates inside the framework, and upright members forming part of said framework are provided with regularly spaced narrow slots at the level of each pair of oppositely located brackets whereby projections on the plates may be engaged inside said slots after the plates have been fully inserted in said framework. These slots are so inclined with respect to the corresponding brackets for supporting a corresponding plate, that the latter will be slightly lifted after it has been fully inserted so that it makes only point contacts with the pair of brackets and is also supported by its two projections which, being located next to the mounting points for the common bar, avoid distortion of the latter due to the weight of the plate and the mechanisms mounted thereon.

The above mentioned and other objects and features of the invention will become more apparent and the invention itself will be best understood from the claims, and by referring to the following description of an embodiment taken in conjunction with the appended drawing which represents a perspective view of the essential parts of the framework for mounting a plurality of plates each supporting a plurality of commutating mechanisms.

A framework 1 is partially shown and can be seen to consist of upright members such as 2 and 3 which are united to two other upright members (not shown) forming the two sides of said framework by horizontal members such as 4, 5 and 6. The upright members such as 2 and 3 are joined by cross pieces such as 7. Between the upright members 2 and 3 and all along their height, brackets such as 8 are mounted, these having an L-shaped cross section as shown. Their horizontal ledge is provided with an embossment 9 while part of the vertical leg has been cut so as to provide a tongue-like strip 10.

One plate only, i. e. 11, has been shown in rudimental form, inserted in the framework. The various commutating mechanisms have been omitted as they form no part of this invention and in this respect reference is made to our said application, Serial No. 280,253. Plate 11 is provided with a rear edge A and a front edge B.

For inserting a plate such as 11 in the framework 1, it will be slid in the direction of arrow from its edges on the horizontal ledges of a pair of oppositely located brackets, one of which such as 8 being shown. When the plate 11 is fully pushed in, projections such as 12 will be in narrow slots such as 13 formed in upright members, one of which 14 is shown. Due to a slight upward inclination of the slots 13, the rear side of the plate 11 will be slightly lifted so that the edges 15 and 15' of the plate 11 will not rest along the whole length of the horizontal ledges of brackets 8 but only on the embossments such as 9. The angle of inclination is such as to cause the rear edge A of plate 11 to raise upward an amount equal to the height of embossments 9 with the result that plate 11 will assume a level horizontal position when fully inserted into the framework 1. Since the projections 12 and 12' are located next to the holding or mounting points 16 and 16' for the actuating and hold bar 17, buckling of the latter will be avoided and jamming of bar 17 when it is displaced longitudinally is prevented. If the plate 11 was supported solely by its edges 15 and 15' which rest on horizontal ledges 8, the middle portion of the plate would tend to sag and thus throw mounting points 16 and 16' out of register resulting in binding of the bar 17 in the mounting points. When in place, the plate 11 will be centered by means of the strips 10 which will exert as slight pressure on the edge 15 of the plate 11. The plates are thus fixed in two perpendicular directions and their position along the third perpendicular direction (arrow *f*), will be defined by means of locking members (not shown) which may be mounted by suitable means (not shown) on the members such as 2 to prevent movement or withdrawal of the inserted plates 11. Such locking means can of course be common for all plates or individual for each.

While the principles of the invention have been described above in connection with specific apparatus, it is to be clearly understood that this description is made only by way of example and not as a limitation on the scope of the invention.

We claim:

1. In an assembly for plates mounting electrical commutating mechanism, a framework having upright side members spaced by horizontal members so as to accommodate said plates, a pair of opposed L-shaped brackets for each plate with the vertical leg attached to the side members, and on whose horizontally protruding ledges a plate may be placed in position with opposed edges thereof gliding on said ledges, an embossment on each horizontal ledge near one end of the bracket, said embossment adapted to raise first edge portions of said plate, a tongue projecting from each vertical leg near the other end of the bracket, a plurality of vertical racks attached to the framework intermediate the side members and having slots inclined to the horizontal, projections on one side of each plate cooperating with a slot in a rack, and mounting points for the commutating mechanism on each plate adjacent said projections, said slots having an angle of inclination sufficient to raise a second edge portion of said plate from said ledges a distance equal to the height of said embossments.

2. In an assembly for plates mounting electrical commutating mechanisms as claimed in claim 1, wherein each of said mounting points comprises a slot in each of said projections, said slots being in register with each other and adapted to be so maintained by said vertical racks thereby to prevent binding of said mechanism with said mounting points.

References Cited in the file of this patent

UNITED STATES PATENTS 2,239,329 Lindstrom ------------ Apr. 22, 1941